United States Patent
Jiang et al.

(10) Patent No.: US 12,495,399 B2
(45) Date of Patent: *Dec. 9, 2025

(54) METHOD AND DEVICE IN UE AND BASE STATION FOR MULTI-ANTENNA COMMUNICATION

(71) Applicant: Dido Wireless Innovations, LLC, Frisco, TX (US)

(72) Inventors: Qi Jiang, Shanghai (CN); Xiaobo Zhang, Shanghai (CN)

(73) Assignee: Dido Wireless Innovations, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/481,137

(22) Filed: Oct. 4, 2023

(65) Prior Publication Data

US 2024/0098709 A1 Mar. 21, 2024

Related U.S. Application Data

(63) Continuation of application No. 17/962,423, filed on Oct. 7, 2022, now Pat. No. 11,818,691, which is a
(Continued)

(51) Int. Cl.
*H04L 1/00* (2006.01)
*H04L 5/00* (2006.01)
(Continued)

(52) U.S. Cl.
CPC ......... *H04W 72/044* (2013.01); *H04L 5/0053* (2013.01); *H04W 72/542* (2023.01)

(58) Field of Classification Search
CPC ... H04L 5/0053; H04L 5/0094; H04L 5/0055; H04L 5/0007; H04L 5/0044;
(Continued)

(56) References Cited

U.S. PATENT DOCUMENTS 11,516,797 B2  11/2022  Jiang et al.
11,818,691 B2  11/2023  Jiang et al.
(Continued)

FOREIGN PATENT DOCUMENTS

CN  102123432 A  7/2011
CN  108809580 B  4/2013
(Continued)

OTHER PUBLICATIONS

Notice of Allowance issued on Apr. 18, 2022 for corresponding U.S. Appl. No. 16/733,203.
(Continued)

*Primary Examiner* — Dady Chery
(74) *Attorney, Agent, or Firm* — Cole Schotz, P.C.; Marcella M. Bodner

(57) ABSTRACT

The present disclosure provides a method and a device in a User Equipment (UE) and a base station for multi-antenna communication. The UE first receives a first radio signal, and then monitors a first signaling set in a first time-frequency resource set; the first radio signal is used for determining that physical layer signaling(s) corresponding to the first signaling set may occupy any of X1 first-type RE sets. In the first time-frequency resource set at most X2 blind detections are performed in the first signaling set, the X2 blind detections are respectively for X2 second-type RE sets, the X2 second-type RE sets are respectively X2 first-type RE sets of the X1 first-type RE sets.

20 Claims, 9 Drawing Sheets

Related U.S. Application Data continuation of application No. 16/733,203, filed on Jan. 2, 2020, now Pat. No. 11,516,797, which is a continuation of application No. PCT/CN2017/091486, filed on Jul. 3, 2017.

(51) Int. Cl.
*H04W 72/044* (2023.01)
*H04W 72/542* (2023.01)

(58) Field of Classification Search
CPC .............. H04L 1/0038; H04W 56/005; H04W 88/023; H04W 88/08; H04W 92/10; H04W 72/04; H04W 72/12; H04W 72/042; H04W 72/1268; H04W 24/08; H04W 72/0446; H04W 72/0453; H04W 48/16; H04B 7/0617; H04B 7/0695
See application file for complete search history.

(56) References Cited

U.S. PATENT DOCUMENTS

| | | | |
|---|---|---|---|
| 2015/0181574 A1* | 6/2015 | Lee | ............... H04J 11/0069 370/329 |
| 2015/0358946 A1 | 12/2015 | Wang et al. | |
| 2017/0099674 A1 | 4/2017 | Han et al. | |
| 2018/0323856 A1 | 11/2018 | Xiong et al. | |
| 2019/0140769 A1* | 5/2019 | Rong | ............... H04L 1/0052 |
| 2020/0145976 A1 | 5/2020 | Jiang et al. | |
| 2023/0035680 A1 | 2/2023 | Jiang et al. | |

FOREIGN PATENT DOCUMENTS

| | | |
|---|---|---|
| CN | 105992378 A | 10/2016 |
| CN | 106793137 A | 5/2017 |
| CN | 110870262 A | 3/2020 |
| CN | 10985825 B2 | 4/2021 |
| CN | 110870262 B | 12/2022 |
| WO | 2010114446 A1 | 10/2010 |
| WO | 2019006592 | 1/2019 |

OTHER PUBLICATIONS

Corrected Notice of Allowance issued on Oct. 5, 2022 for corresponding U.S. Appl. No. 16/733,203.
Issue Notification issued on Oct. 25, 2023 for corresponding U.S. Appl. No. 17/962,423.
Non-Final Office Action issued on Mar. 28, 2023 for corresponding U.S. Appl. No. 17/962,423.
Notice of Allowance issued on Jul. 12, 2023 for corresponding U.S. Appl. No. 17/962,423.
Issue Notification issued on Nov. 9, 2022 for corresponding U.S. Appl. No. 16/733,203.
Corrected Notice of Allowance issued on Oct. 28, 2022 for corresponding U.S. Appl. No. 16/733,203.
Notice of Allowance issued on Jul. 13, 2022 for corresponding U.S. Appl. No. 16/733,203.
International Preliminary Report on Patentability issued on Jan. 7, 2020 for corresponding International Patent Application No. PCT/CN2017/091486.
English translation of International Preliminary Report on Patentability issued on Jan. 7, 2020 for corresponding International Patent Application No. PCT/CN2017/091486.
Written Opinion issued on Mar. 27, 2018 for corresponding International Patent Application No. PCT/CN2017/091486.
English translation of Written Opinion issued on Mar. 27, 2018 for corresponding International Patent Application No. PCT/CN2017/091486.
English translation for International Search Report issued on Mar. 27, 2018.
Non-Final Office Action issued on Nov. 23, 2021 for corresponding U.S. Appl. No. 16/733,203.
TS 136 213 V8.8.0, Physical Layer Procedures. pp. 1-79, Oct. 2009.
R1-1707379 3GPP TSG RAN WG1 #89, CORESETs for NR PDCCH, pp. 1-5, May 15-19, 2017.

* cited by examiner

METHOD AND DEVICE IN UE AND BASE STATION FOR MULTI-ANTENNA COMMUNICATION

CROSS-REFERENCE TO RELATED APPLICATION

This application is a continuation of U.S. patent application Ser. No. 17/962,423, which is a continuation of the U.S. patent application Ser. No. 16/733,203 (now U.S. Pat. No. 11,516,797), filed on Jan. 2, 2020, which is a continuation of International Application No. PCT/CN2017/091486, filed Jul. 3, 2017, the full disclosure of which is incorporated herein by reference.

BACKGROUND

Technical Field

The present disclosure relates to methods and devices in multi-antenna communication systems, and in particular to a method and a device for receiving of physical layer control signaling.

Related Art

In the current Long-term Evolution (LTE) system, for a downlink subframe, a User Equipment (UE) may search for a piece of corresponding Downlink Control Information (DCI) in the downlink subframe. A Downlink Grant usually schedules a Downlink Shared Channel (DL-SCH) for a present subframe, while an Uplink Grant schedules an Uplink Shared Channel (UL-SCH) for a subsequent subframe. The system allocates via a higher layer signaling two varied DCI formats to the UE, which respectively correspond to different payload sizes. The UE, when receiving the DCI, performs blind detections based on the two payload sizes respectively, and a largest number of blind detections performed by the UE on a given carrier is limited. In 5G communication system, there will be wide application of beamforming, in which the manner of DCI blind detection needs to be reconsidered.

SUMMARY

In 5G system, the concepts of Beam Recovery (BR) and Beam Link Failure (BFL) are under hot debate. A UE detects many present beams to acquire dynamic scheduling, when channel qualities of the beams detected by the UE are getting worse, the UE will send Beam Recovery Request (BRR) to the base station asking for additional beam resources, so as to monitor the physical layer control signaling.

Such concepts are introduced to ensure that the UE can be switched to another beam to be served immediately after discovering the degenerating channel quality of a present beam. The above BR and BLF won't trigger the process on a Radio Resource Control (RRC) layer, thereby guaranteeing swift changes between beams. As currently defined in 3GPP, as soon as the UE sends out BRR, the BRR carries information of a UE-recommended beam, and then the UE monitors feedback to the BRR on the recommended beam. In view of the issue, considering the reception of DCI not corresponding to the feedback of the BRR, a simple way of implementation is to increase the blind detections on the BRR by a positive integer number without interrupting normal DCI receiving, but there is an evident disadvantage of enhanced complexity in UE blind detection.

To address the above problem, the present disclosure provides a solution. It should be noted that the embodiments of the present disclosure and the characteristics in the embodiments may be mutually combined if no conflict is incurred. For instance, the embodiments in the present disclosure and the characteristics in the embodiments may be applied to a base station if no conflict is incurred, and vice versa.

The present disclosure provides a method in a UE for multi-antenna communication, comprising:
  receiving a first radio signal; and
  monitoring a first signaling set in a first time-frequency resource set;
  herein, the first signaling set comprises M1 format(s) of physical layer signaling(s), the first radio signal is used for determining that the physical layer signaling(s) in the first signaling set may occupy any first-type Resource Element (RE) set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one embodiment, the above method is advantageous in that the X2 second-type RE sets are respectively X2 first-type RE sets of the X1 first-type RE sets, such design helps decrease the total number of blind detections in the first signaling set, thereby guaranteeing that no more complicated features will be found in blind detections of the UE when detecting the feedback to beam recovery requests.

According to one aspect of the present disclosure, the above method is characterized in comprising:
  transmitting a second radio signal;
  herein, the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

In one embodiment, the above method is advantageous in that the second signaling set is used for transmitting feedback to beam recovery requests, and an increase in the number of blind detections in the second signaling set never exceeds the X1, therefore, the UE can be implemented with lower complexity.

According to one aspect of the present disclosure, the above method is characterized in that the second radio signal is used for determining a first antenna port set, the first antenna port set comprises a positive integer number of antenna port(s), the UE assumes that the second signaling set is transmitted by the first antenna port set.

In one embodiment, the essence of the above method lies in that the UE transmits the first antenna port set recommended to a serving base station through the second radio signal, expecting the serving base station to change the beam assigned for the transmitting of UE's control signaling.

According to one aspect of the present disclosure, the above method is characterized in comprising:

monitoring K target radio signal(s) respectively on K target antenna port set(s);

herein, the K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer.

In one embodiment, the essence of the above method lies in that the K target antenna port set(s) respectively corresponds(correspond) to K transmitting antenna port set(s) corresponding to the UE monitoring a physical layer dynamic signaling, when the K channel quality(qualities) corresponding to the K target antenna port set(s) gets(get) poorer, the UE initializes BR process.

According to one aspect of the present disclosure, the above method is characterized in comprising:

receiving a third radio signal;

herein, the third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2.

In one embodiment, the above method is advantageous in that the base station triggers changes in the manner of blind detection only through the third radio signal rather than through BRR sent targeting the UE, thus conserving overhead for control signaling.

In one embodiment, the above method is advantageous also in that the third radio signal is used for other information transmissions, when, for example, transmitting Slot Format Information (SFI), the UE confirms how the blind detection manner changes according to the information of SFI, and consequently, adjusts the number of blind detections in the first signaling set more flexibly, thus reducing the complexity of UE implementation.

According to one aspect of the present disclosure, the above method is characterized in that X3 second-type RE set(s) of the X2 second-type RE sets is(are) standardized, the UE self-determines the second-type RE set(s) of the X2 second-type RE sets other than the X3 second-type RE set(s), X3 is a positive integer less than the X2.

In one embodiment, the above method is advantageous in that among the X2 second-type RE sets, the X3 second-type RE set(s) is(are) determined by the base station and the UE together, and the second-type RE set(s) other than the X3 second-type RE set(s) is(are) determined by the UE autonomously; the X3 second-type RE set(s) is(are) used for ensuring the robustness of receiving of the first signaling set; while the second-type RE set(s) other than the X3 second-type RE set(s) is(are) used for increasing the flexibility of the UE, and further enhancing receiving efficiency.

According to one aspect of the present disclosure, the above method is characterized in that a number of REs comprised in any first-type RE set of the X1 first-type RE sets other than the X2 second-type RE sets is less than or equal to a number of REs comprised in any of the X2 second-type RE sets.

In one embodiment, the above method is advantageous in that when the UE is in the state of BR, any of the second-type RE set(s) for the BR status is occupying a larger number of REs, thus ensuring the robustness of the first signaling set.

The present disclosure provides a method in a base station for multi-antenna communication, comprising:

transmitting a first radio signal; and transmitting a first signaling set in a first time-frequency resource set;

herein, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

According to one aspect of the present disclosure, the above method is characterized in comprising:

receiving a second radio signal;

herein, the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

According to one aspect of the present disclosure, the above method is characterized in that the second radio signal is used for determining a first antenna port set, the first antenna port set comprises a positive integer number of antenna port(s), the transmitter of the second radio signal assumes that the second signaling set is transmitted by the first antenna port set.

According to one aspect of the present disclosure, the above method is characterized in comprising:

transmitting K target radio signal(s) respectively on K target antenna port set(s);

herein, the K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer.

According to one aspect of the present disclosure, the above method is characterized in comprising:

transmitting a third radio signal;

herein, the third radio signal is used for triggering a monitoring on a third signaling set, the third signaling set comprises M3 format(s) of physical layer signaling(s), M3 is a positive integer; the third radio signal is used for determining that a maximum number of blind detections performed in the first signaling set in the first time-frequency resource set is shifted from the X1 to the X2.

According to one aspect of the present disclosure, the above method is characterized in that X3 second-type RE set(s) of the X2 second-type RE sets is(are) standardized, the base station transmits the first signaling set in the X3 second-type RE set(s) in the first place, the X3 is a positive integer less than the X2.

According to one aspect of the present disclosure, the above method is characterized in that a number of REs comprised in any first-type RE set of the X1 first-type RE sets other than the X2 second-type RE sets is less than or equal to a number of REs comprised in any of the X2 second-type RE sets.

The present disclosure provides a UE for multi-antenna communication, comprising:
  a first receiver, receiving a first radio signal; and
  a first transceiver, monitoring a first signaling set in a first time-frequency resource set;
  herein, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one embodiment, the above UE for multi-antenna communication is characterized in that the first transceiver also transmits a second radio signal; the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

In one embodiment, the above UE for multi-antenna communication is characterized in that the second radio signal is used for determine a first antenna port set, the first antenna port set comprises a positive integer number of antenna port(s), the UE assumes that the second signaling set is transmitted by the first antenna port set.

In one embodiment, the above UE for multi-antenna communication is characterized in that the first transceiver also monitors K target radio signal(s) respectively on K target antenna port set(s); the K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer.

In one embodiment, the above UE for multi-antenna communication is characterized in that the first transceiver also receives a third radio signal; the third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2.

In one embodiment, the above UE for multi-antenna communication is characterized in that X3 second-type RE set(s) of the X2 second-type RE sets is(are) standardized, the UE self-determines the second-type RE set(s) of the X2 second-type RE sets other than the X3 second-type RE set(s), X3 is a positive integer less than the X2.

In one embodiment, the above UE for multi-antenna communication is characterized in that a number of REs comprised in any first-type RE set of the X1 first-type RE sets other than the X2 second-type RE sets is less than or equal to a number of REs comprised in any of the X2 second-type RE sets.

The present disclosure provides a base station for multi-antenna communication, comprising:
  a first transmitter, transmitting a first radio signal; and
  a second transceiver, transmitting a first signaling set in a first time-frequency resource set;
  herein, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one embodiment, the above base station for multi-antenna communication is characterized in that the second transceiver also receives a second radio signal; the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

In one embodiment, the above base station for multi-antenna communication is characterized in that the second radio signal is used for determining a first antenna port set, the first antenna port set comprises a positive integer number of antenna port(s), the transmitter of the second radio signal assumes that the second signaling set is transmitted by the first antenna port set.

In one embodiment, the above base station for multi-antenna communication is characterized in that the second transceiver also transmits K target radio signal(s) respectively on K target antenna port set(s); the K target radio signal(s) is(are) used for determining K channel quality (qualities), at least one of the K target antenna port set(s) is used for transmitting the first signaling set, the first antenna port set is an antenna port set other than the K target antenna port set(s), K is a positive integer.

In one embodiment, the above base station for multi-antenna communication is characterized in that the second transceiver also transmits a third radio signal; the third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2.

In one embodiment, the above base station for multi-antenna communication is characterized in that X3 second-type RE set(s) of the X2 second-type RE sets is(are) standardized, the base station transmits the first signaling set in the X3 second-type RE set(s) in the first place, the X3 is a positive integer less than the X2.

In one embodiment, the above base station for multi-antenna communication is characterized in that a number of REs comprised in any first-type RE set of the X1 first-type RE sets other than the X2 second-type RE sets is less than or equal to a number of REs comprised in any of the X2 second-type RE sets.

In one embodiment, the present disclosure has the following advantages over prior art:

By designing the X2 second-type RE sets as X2 of the X1 first-type RE sets respectively, the number of blind detections in the first signaling set can be reduced, which in turn ensures that no more complicated features will be found in blind detections of the UE while increasing detections on the feedback to BRR.

The second signaling set is used for transmitting feedback to BRR, and an increase in the number of blind detections in the second signaling set won't exceed the X1, thus reducing the complexity of UE implementation.

The base station determines the BRR sent by the UE via the third radio signal and then triggers changes in the manner of blind detections of the UE, thereby conserving control signaling overhead.

The third radio signal is used for other information transmissions, for example, when transmitting Slot Format Information (SFI), the UE determines how the manner of blind detection changes in accordance with SFI, and flexibly adjusts the total number of blind detections in the first signaling set, so as to lower the complexity in UE implementation.

Among the X2 second-type RE sets, the X3 second-type RE set(s) is(are) determined by the base station and the UE together, while the other second-type RE set(s) is(are) determined by the UE itself; the X3 second-type RE set(s) is(are) used for guaranteeing the robustness in the receiving of the first signaling set; the second-type RE set(s) other than the X3 second-type RE set(s) is(are) used for enhancing the flexibility of the UE, and further, improving the effectiveness of receiving.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
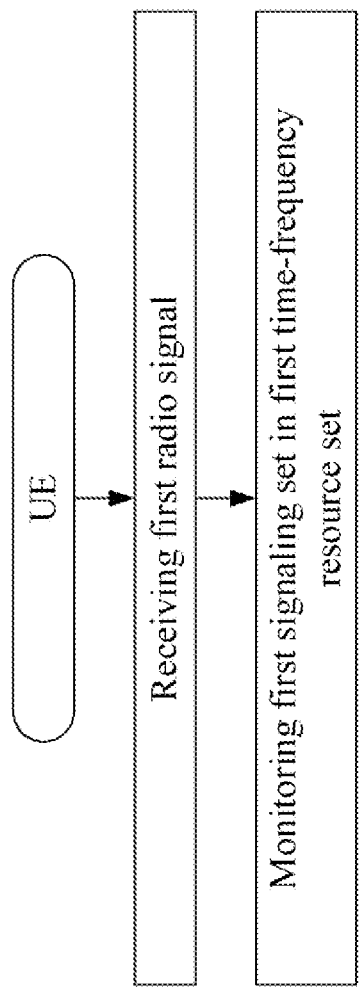
FIG. 1 illustrates a flowchart of a first radio signal according to one embodiment of the present disclosure.

Embodiment 1 illustrates a flowchart of a first radio signal according to the present disclosure, as shown in FIG. 1. The UE in the present disclosure first receives a first radio signal; and then monitors a first signaling set in a first time-frequency resource set. The first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one subembodiment, the first radio signal is used for determining at least one of time domain resources or frequency domain resources occupied by the first time-frequency resource set.

In one subembodiment, the first radio signal is used for determining X1 first-type RE sets.

In one subsidiary embodiment of the above subembodiment, the phrase that the first radio signal is used for determining X1 first-type RE sets means that the first radio signal is used for determining the X1.

In one subsidiary embodiment of the above subembodiment, the phrase that the first radio signal is used for determining X1 first-type RE sets means that the first radio signal is used for determining time domain positions and frequency domain positions of REs occupied by the X1 first-type RE sets in the first time-frequency resource set.

In one subembodiment, the monitoring action means that the UE performs a blind detection on a given signaling set in accordance of a given format, the given format is one of the M1 format(s) and the given signaling set is the first signaling set.

In one subembodiment, the blind detection refers to demodulation and decoding of DCI.

In one subembodiment, the blind detection includes checks on Cyclic Redundancy Check (CRC).

In one subembodiment, the monitoring action means that the UE determines according to CRC check whether the first signaling set is transmitted.

In one subembodiment, the blind detection includes performing channel decoding on a receiving signal in a target RE set, and performing CRC check on decoded bits so as to determine whether the receiving signal comprises the first signaling set.

In one subsidiary embodiment of the above subembodiment, the channel decoding is based on a polar code.

In one subembodiment, the blind detection refers to blind decoding.

In one subembodiment, the format of the physical layer signaling corresponds to a DCI format.

In one subembodiment, the first signaling set comprises a positive integer number of first signaling(s), wherein a physical layer channel for any of the first signaling is one of a Physical Downlink Control Channel (PDCCH), a New RAT PDCCH (NR-PDCCH) or a Short Latency PDCCH (SPDCCH).

In one subembodiment, the first time-frequency resource set is composed of a positive integer number of REs, the first time-frequency resource set at least comprises two REs respectively corresponding to different subcarrier spacings.

In one subembodiment, the first time-frequency resource set is a search space.

In one subembodiment, the first time-frequency resource set occupies a positive integer number of Orthogonal Frequency Division Multiplexing (OFDM) symbol(s) in time domain and frequency bandwidth of a positive integer number of Physical Resource Block(s) (PRB(s)) in frequency domain.

In one subembodiment, the first time-frequency resource set is composed of a plurality of REs.

In one subembodiment, the M1 is greater than 1.

In one subembodiment, the first signaling set comprises a target signaling, the target signaling comprising a given CRC, the given CRC is scrambled through a UE-specific Radio Network Temporary Identity (RNTI).

In one subembodiment, the RE in the present disclosure occupies an OFDM symbol in time domain and a subcarrier in frequency domain.

In one subsidiary embodiment of the above subembodiment, the subcarrier spacing is one of 15 kHz, 30 kHz, 60 kHz, 120 kHz or 240 kHz.

In one subsidiary embodiment, the X1 is less than or equal to X, the X is a positive integer.

In one subsidiary embodiment of the above subembodiment, the X is greater than 43.

In one subsidiary embodiment of the above subembodiment, the X is a maximum number of blind detections supported by the UE on a given carrier, the first signaling set is transmitted on the given carrier.

In one subsidiary embodiment of the above subembodiment, the X is a constant.

In one subsidiary embodiment of the above subembodiment, the X is a maximum number of blind detections supported by the UE, and the X is related to the number of carriers configured by the UE at present.

In one subembodiment, any of the first-type RE sets is a candidate for the first signaling set.

In one subembodiment, any of the first-type RE sets is a candidate for the M1 format(s) of physical layer signaling(s).

In one subembodiment, any of the second-type RE sets is a candidate for the first signaling set.

In one subembodiment, any of the second-type RE sets is a candidate for the M1 format(s) of physical layer signaling(s).

In one subembodiment, any of the second-type RE sets is a candidate for a given signaling set, the given signaling set is a subset of the first signaling set.

In one subembodiment, any of the second-type RE sets is a candidate for Q1 format(s) of physical layer signaling(s), the Q1 format(s) is(are) a subset of the M1 formats, the Q1 is a positive integer less than the M1.

In one subembodiment, the X2 is unknown to a transmitter of the first radio signal.

In one subsidiary embodiment of the above subembodiment, the transmitter of the first radio signal is a base station corresponding to a serving cell of the UE.

In one subsidiary embodiment of the above subembodiment, the transmitter of the first radio signal is a Transmission Reception Point (TRP) that serves the UE.

Embodiment 2

Figure 2:
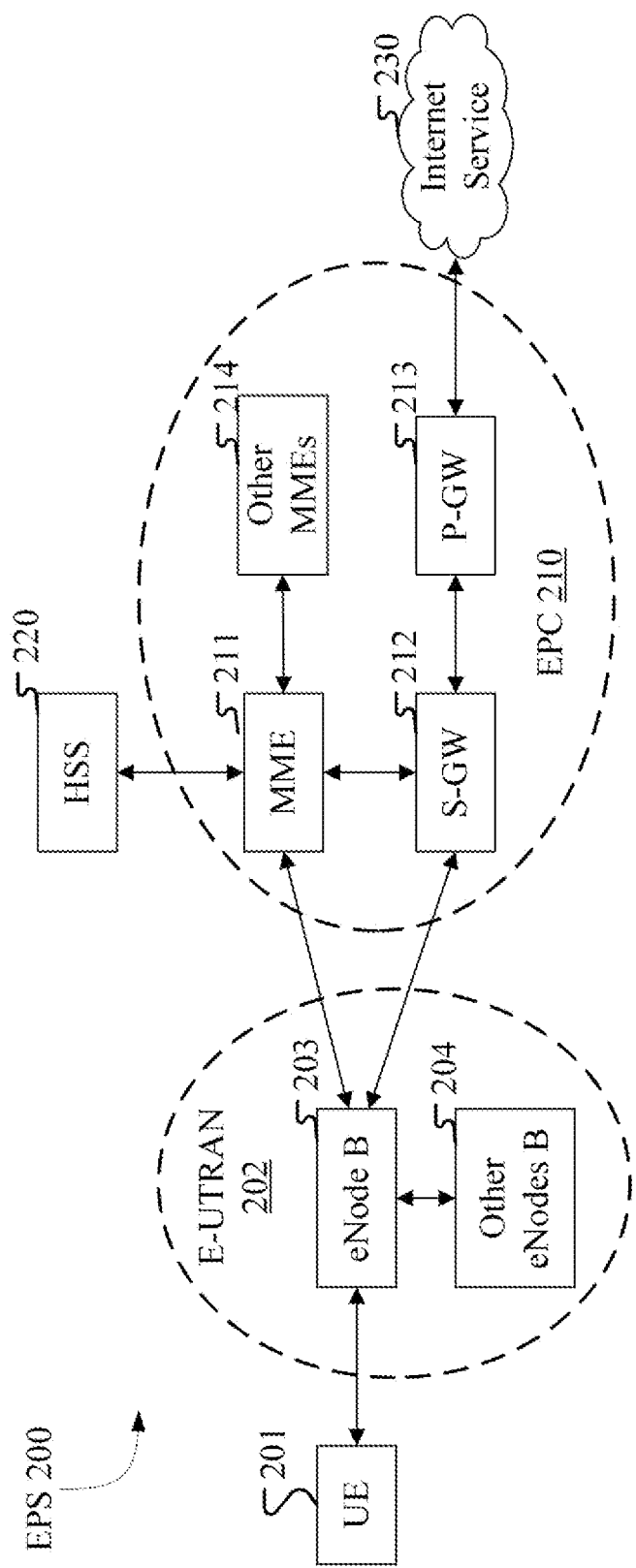
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN 202, an Evolved Packet Core (EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN 202 comprises an evolved node B (eNB) 203 and other eNBs 204. The eNB 203 provides UE 201-oriented user plane and control plane protocol terminations. The eNB 203 may be connected to other eNBs 204 via an X2 interface (for example, backhaul). The eNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The eNB 203 provides an access point of the EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The eNB 203 is connected to the EPC 210 via an Si interface. The EPC 210 comprises an MME 211, other MMES 214, a Service Gateway (S-GW) 212 and a Packet Date Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services (PSSs).

In one subembodiment, the UE 201 corresponds to the UE in the present disclosure.

In one subembodiment, the eNB 203 corresponds to the base station in the present disclosure.

In one subembodiment, the UE 201 supports multi-antenna communication.

In one subembodiment, the UE 201 supports beamforming-based communication.

In one subembodiment, the eNB 203 supports beamforming-based communication.

Embodiment 3

Figure 3:
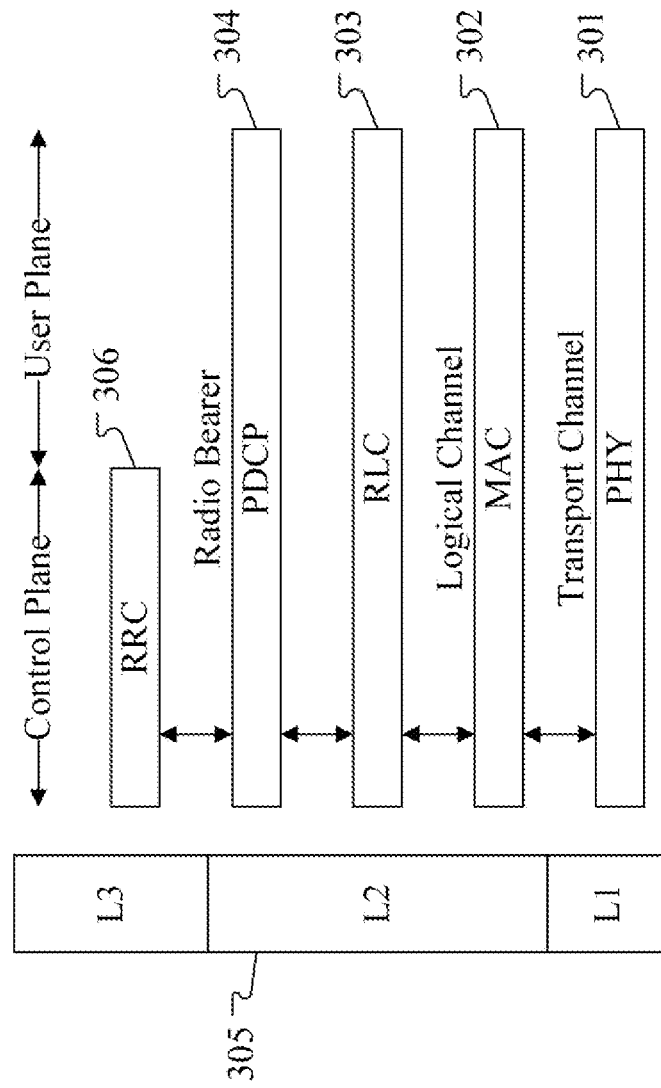
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating a radio protocol architecture of a user plane and a control plane. In FIG. 3, the radio protocol architecture for a UE and an eNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the eNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the eNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between eNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the eNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the eNB and the UE.

In one subembodiment, the radio protocol architecture in FIG. 3 is applicable to the UE of the present disclosure.

In one subembodiment, the first signaling set in the present disclosure is generated by the PHY 301.

In one subembodiment, the second signaling set in the present disclosure is generated by the PHY 301.

In one subembodiment, the third signaling set in the present disclosure is generated by the PHY 301.

In one subembodiment, the first radio signal in the present disclosure is generated by the RRC sublayer 306.

In one subembodiment, the second radio signal in the present disclosure is generated by the MAC sublayer 302.

In one subembodiment, the second radio signal in the present disclosure is terminated at the MAC sublayer 302.

In one subembodiment, the third radio signal in the present disclosure is generated by the RRC sublayer 306.

In one subembodiment, the third radio signal in the present disclosure is generated by the MAC sublayer 302.

In one subembodiment, the third radio signal in the present disclosure is terminated at the MAC sublayer 302.

Embodiment 4

Figure 4:
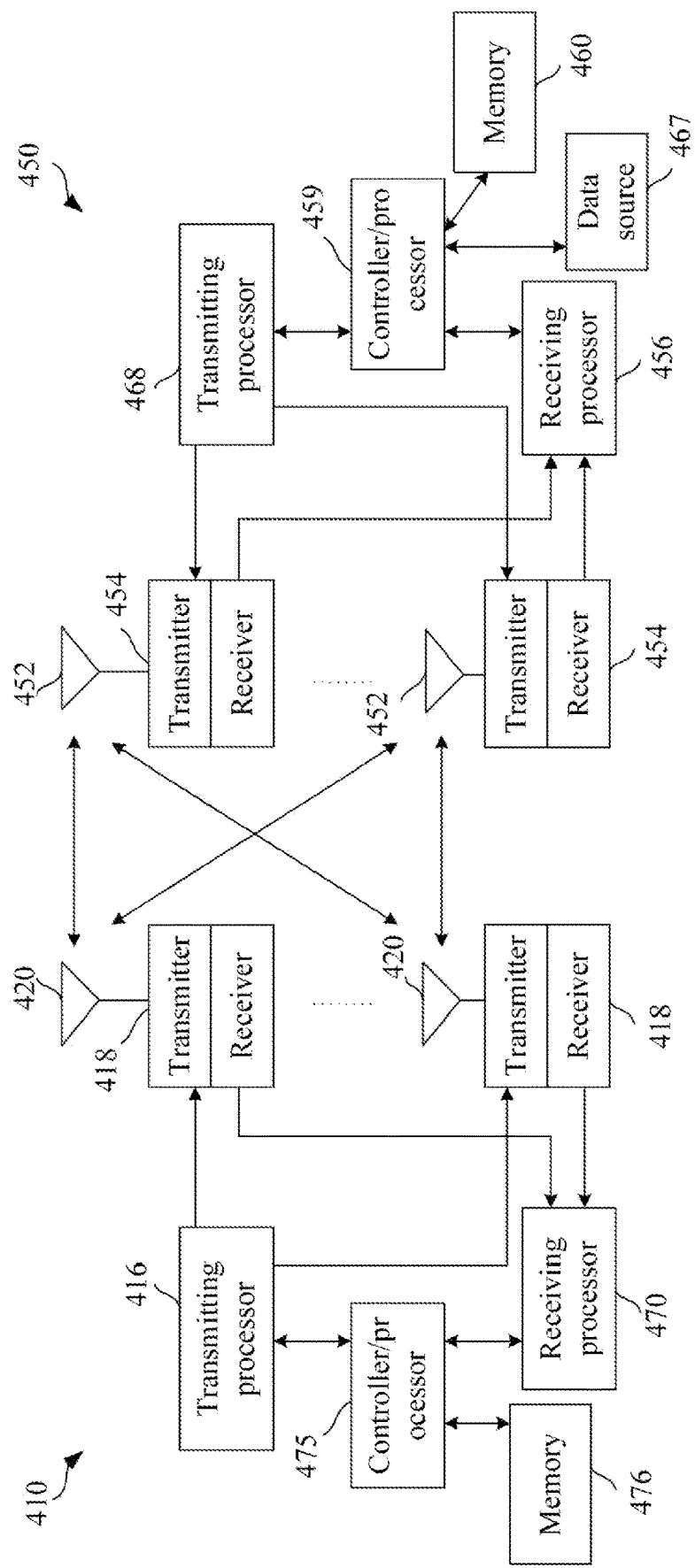
FIG. 4 illustrates a schematic diagram of an evolved (e)-Node and a given UE according to one embodiment of the present disclosure.

Embodiment 4 illustrates a schematic diagram of an evolved(e)-Node and a given UE according to the present disclosure, as shown in FIG. 4. FIG. 4 is a block diagram of an eNB 410 in communication with a UE 450 in an access network. In Downlink (DL) transmission, a higher layer packet from a core network is provided to a controller/processor 475. The controller/processor 475 implements the functionality of the L2 layer. In DL, the controller/processor 475 provides header compression, encrypting, packet segmentation and reordering, and multiplexing between a logical channel and a transport channel, as well as radio resource allocation for the UE 450 based on various priorities. The controller/processor 475 is also in charge of HARQ operation, retransmission of a lost packet, and a signaling to the UE 450. The transmitting processor 416 performs signal processing functions used for the L1 layer (that is, PHY), which include decoding and interleaving so as to ensure a Forward Error Correction (FEC) at the UE 450 side, and the mapping to signal clusters corresponding to each modulation scheme (i.e., BPSK, QPSK, M-PSK, M-QAM, etc.) Following that decoded and modulated symbols are split into parallel streams, and each of them is then mapped into a subcarrier of a multicarrier to be multiplexed with a reference signal (for example, a pilot frequency) in time domain and/or frequency domain. After that they are assembled through Inverse Fast Fourier Transform (IFFT) to generate a physical channel carrying time-domain multi-carrier symbol streams. The multicarrier symbol streams are subjected to spatial precoding to generate multiple spatial streams. Each spatial stream is later provided to different antennas 420 via a transmitter 418. Every transmitter 418 is used to transmit a corresponding spatial stream modulation Radio Frequency (RF) carrier. At the UE 450 side, each receiver 454 receives a signal via a corresponding antenna 452. Each receiver 454 recovers information modulated to the RF carrier and provides the information to a receiving processor 456. The receiving processor 456 performs signal processing functions of the L1 layer. The receiving processor 456 performs spatial processing on the information to recover any spatial stream targeting the UE 450. If there are multiple spatial streams targeting the UE 450, the multiple spatial streams can be assembled into a single multi-carrier symbol stream by the receiving processor 456. The receiving processor 456 then converts the multi-carrier symbol stream from time domain into frequency domain using FFT. A frequency domain signal includes a single multi-carrier symbol stream for each subcarrier of multi-carrier signals. The symbol and reference signal on each subcarrier are recovered and demodulated by determining the most possible signal cluster point transmitted by the eNB 410, and generate a soft decision. The soft decision is then decoded and de-interleaved so as to recover the original data and control signal transmitted by the eNB 410 on the physical channel. The data and control signal are then provided to a controller/processor 459. The controller/processor 459 performs functions of the L2 layer. The controller/processor 459 can be connected to a memory 460 that stores program code and data. The memory 460 may be called a computer readable medium. In Uplink (UL) transmission, the controller/processor 459 provides the de-multiplexing between the transport channel and the logical channel, packet reassembling, decrypting, header decompression, and control signaling processing so as to recover a higher-layer packet coming from the core network. The controller/processor 459 also performs error detection using ACK and/or NACK protocols to support the HARQ operation. In the UL transmission, a data source 467 provides a higher-layer packet to the controller/processor 459. The data source 467 represents all the protocol layers above the L2 layer. Similar as the functionality described of the eNB 410 in DL transmission, the controller/processor 459 provides header compression, encrypting, packet segmentation and reordering, and multiplexing between a logical channel and a transport channel based on the radio resource allocation of the eNB 410 so as to provide the functions of the L2 layer used for the user plane and control plane. The controller/processor 459 is in charge of HARQ operation, retransmission of a lost packet, and signaling to the eNB 410. Channel estimates derived by a channel estimator 458 from a reference signal or feedback transmitted by the eNB 410 may be used by the transmitting processor 468 to select appropriate decoding and modulation schemes, and to facilitate spatial processing. A spatial stream generated by the transmitting processor 468 is provided to different antennas 452 via a single transmitter 454. Each transmitter 454 is used to transmit a corresponding spatial stream modulation RF carrier. The uplink transmission at the eNB 410 is processed as similar as the function described of the receiver at the UE 450. Each receiver 418 receives a signal via a corresponding antenna 420. Each receiver 418 recovers information modulated to the RF carrier, and provides the information to a receiving processor 470. The receiving processor 470 can provide functions of the L1 layer. A controller/processor 475 can provide functions of the L2 layer. The controller/processor 475 can be connected with the memory 476 that stores program code and data. The memory 476 can be called a computer readable media. In UL transmission, the controller/processor 475 provides the de-multiplexing between the transport channel and the logical channel, packet reassembling, decrypting, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one subembodiment, the UE 450 comprises at least one processor and at least one memory. The at least one memory includes computer program codes. The at least one memory and the computer program codes are configured to be used in collaboration with the at least one processor.

In one embodiment, the UE 450 comprises a memory that stores a computer readable instruction program. The computer readable instruction program generates an action when executed by at least one processor. The action includes: receiving a first radio signal, and monitoring a first signaling set in a first time-frequency resource set.

In one embodiment, the eNB 410 comprises at least one processor and at least one memory. The at least one memory includes computer program codes. The at least one memory and the computer program codes are configured to be used in collaboration with the at least one processor.

In one embodiment, the eNB 410 comprises a memory that stores a computer readable instruction program. The computer readable instruction program generates an action when executed by at least one processor. The action includes: transmitting a first radio signal, and transmitting a first signaling set in a first time-frequency resource set.

In one subembodiment, the UE 450 corresponds to the UE in the present disclosure.

In one subembodiment, the eNB 410 corresponds to the base station in the present disclosure.

In one subembodiment, at least one of the receiving processor 456 or the controller/processor 459 receives a first radio signal.

In one subembodiment, at least one of the receiving processor 456 or the controller/processor 459 monitors a first signaling set in a first time-frequency resource set.

In one subembodiment, at least one of the transmitting processor 468 or the controller/processor 459 transmits a second radio signal.

In one subembodiment, at least one of the receiving processor 456 or the controller/processor 459 monitors K target radio signal(s) respectively on K target antenna port set(s).

In one subembodiment, at least one of the receiving processor 456 or the controller/processor 459 receives a third radio signal.

In one subembodiment, at least one of the transmitting processor 416 or the controller/processor 475 transmits a first radio signal.

In one subembodiment, at least one of the transmitting processor 416 or the controller/processor 475 transmits a first signaling set in a first time-frequency resource set.

In one subembodiment, at least one of the receiving processor 470 or the controller/processor 475 receives a second radio signal.

In one subembodiment, at least one of the transmitting processor 416 or the controller/processor 475 transmits K target radio signal(s) respectively on K target antenna port set(s).

In one subembodiment, at least one of the transmitting processor 416 or the controller/processor 475 transmits a third radio signal.

Embodiment 5

Figure 5:
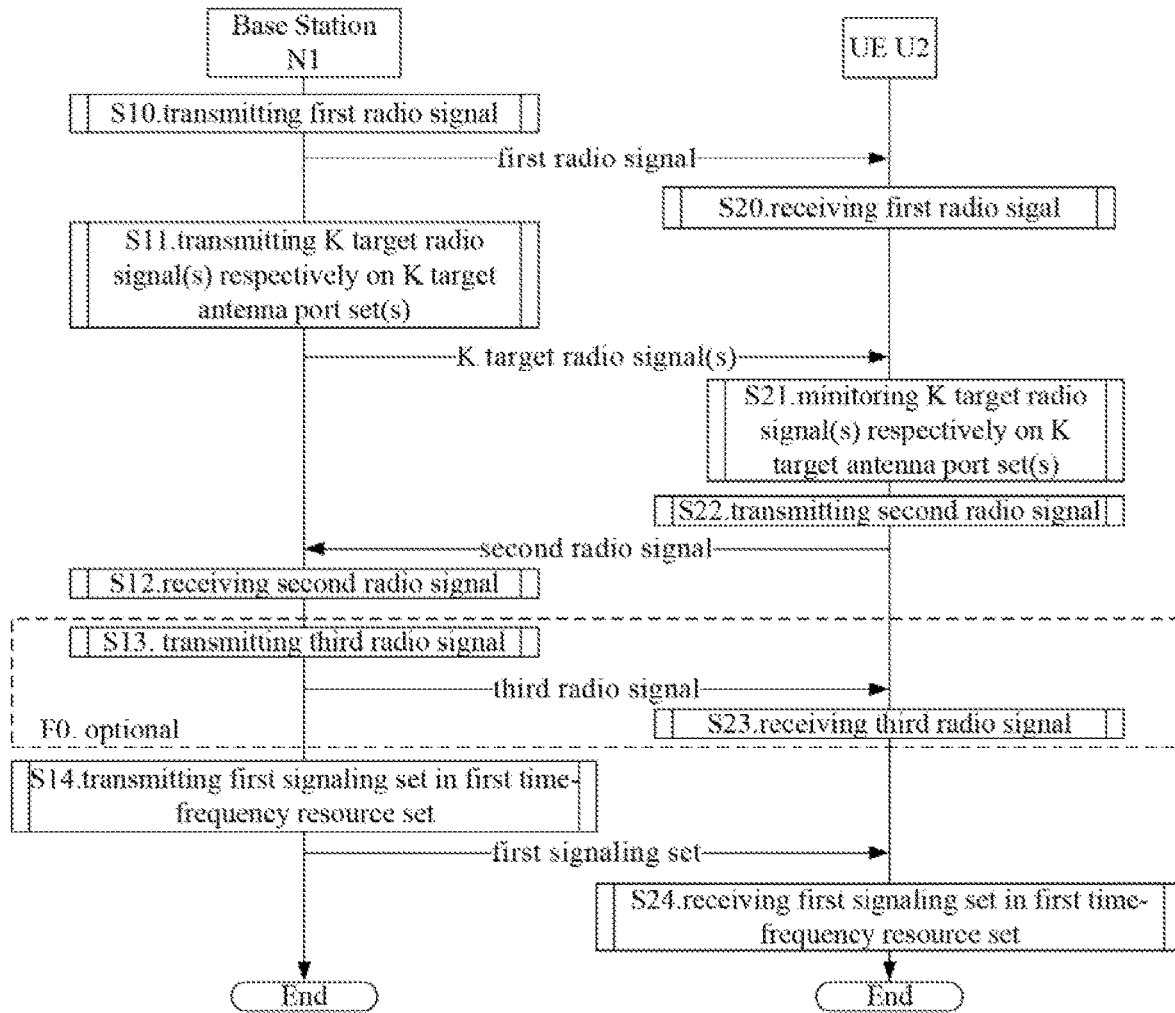
FIG. 5 illustrates a flowchart of transmission of a first signaling set according to one embodiment of the present disclosure.

Embodiment 5 illustrates a flowchart of transmission of a first signaling set according to the present disclosure; as shown in FIG. 5. In FIG. 5, a base station N1 is a maintenance base station for a serving cell of a UE U2, steps in box F0 are optional.

The base station N1 transmits a first radio signal in step S10, transmits K target radio signal(s) respectively on K target antenna port set(s) in step S11, receives a second radio signal in step S12, transmits a third radio signal in step S13, and transmits a first signaling set in a first time-frequency resource set in step S14.

The UE U2 receives a first radio signal in step S20, monitors K target radio signal(s) respectively on K target antenna port set(s) in step S21, transmits a second radio signal in step S22, receives a third radio signal in step S23, and monitors a first signaling set in a first time-frequency resource set in step S24.

In Embodiment 5, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s). The second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2. The second radio signal is used for determining a first antenna port set, the first antenna port set comprises a positive integer number of antenna port(s), the U2 assumes that the second signaling set is transmitted by the first antenna port set. The K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer. The third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2. X3 second-type RE set(s) of the X2 second-type RE sets is(are) standardized, the U2 self-determines the second-type RE set(s) of the X2 second-type RE sets other than the X3 second-type RE set(s), X3 is a positive integer less than the X2; the N1 transmits the first signaling set in the X3 second-type RE set(s) in the first place, the X3 is a positive integer less than the X2. A number of REs comprised in any first-type RE set of the X1 first-type RE sets other than the X2 second-type RE sets is less than or equal to a number of REs comprised in any of the X2 second-type RE sets.

In one subembodiment, the second radio signal is Beam Recovery Request (BRR).

In one subembodiment, the second signaling set is used for determining feedback to the second radio signal.

In one subembodiment, the second radio signal is transmitted in a Random Access Channel (RACH).

In one subembodiment, the second radio signal is transmitted in an Uplink Shared Channel (UL-SCH).

In one subembodiment, the second radio signal is transmitted in Uplink Control Information (UCI).

In one subembodiment, the second radio signal is used for triggering a monitoring on the second signaling set in a first time window.

In one subsidiary embodiment of the above subembodiment, the first time window comprises T time sub-window(s) in time domain, T is a positive integer.

As one example of the subsidiary embodiment, the T is equal to 1.

As one example of the subsidiary embodiment, the T time sub-windows are consecutive in time domain.

As one example of the subsidiary embodiment, the time sub-window is one of subframe, slot or mini-slot.

In one subembodiment, the phrase that the second radio signal is used for triggering a monitoring on a second signaling set means that the UE performs blind detection on the second signaling set in a given time window after transmitting the second radio signal.

In one subembodiment, the phrase that the second radio signal is used for triggering a monitoring on a second signaling set means that the UE performs blind detection on the second signaling set in a given time window, wherein the position of the given time window is related to time domain resources occupied by the second radio signal.

In one subsidiary embodiment of the above subembodiment, the given time window is located behind the second radio signal in time domain.

In one subsidiary embodiment of the above subembodiment, the given time window occupies a positive integer number of consecutive subframes.

In one subsidiary embodiment of the above subembodiment, the given time window occupies a positive integer number of consecutive slots.

In one subsidiary embodiment of the above subembodiment, the given time window occupies a positive integer number of consecutive mini-slots.

In one subembodiment, the second signaling set comprises a positive integer number of second signaling(s), wherein a physical layer channel for any of the second signaling is one of a PDCCH, a NR-PDCCH or a SPDCCH.

In one subembodiment, the M2 is equal to 1.

In one subembodiment, any of the M2 formats does not belong the M1 formats.

In one subembodiment, the second signaling set only comprises a target signaling.

In one subsidiary embodiment of the above subembodiment, the target signaling includes a given CRC, the given CRC is scrambled through an RNTI other than the UE-specific RNTI.

In one subsidiary embodiment of the above subembodiment, the target signaling is used for scheduling feedback to BRR.

In one subsidiary embodiment of the above subembodiment, the target signaling is used for determining to schedule feedback to BRR.

In one subembodiment, REs comprised in the second signaling set all belong to a second time-frequency resource set, the UE performs at most Y2 blind detection(s) on the second signaling set in the second time-frequency resource set, Y2 is a difference between the X1 and the X2.

In one subembodiment, REs comprised in the second signaling set all belong to a second time-frequency resource set, the second time-frequency resource set and the first time-frequency resource set both belong to a first time-frequency resource block.

In one subsidiary embodiment of the above subembodiment, the second time-frequency resource set is a search space.

In one subsidiary embodiment of the above subembodiment, the second time-frequency resource set occupies a positive integer number of OFDM symbol(s) in time domain, and frequency bandwidth of a positive integer number of PRB(s) in frequency domain.

In one subsidiary embodiment of the above subembodiment, the first time-frequency resource block is a Control Resource Set (CORESET).

In one subembodiment, the first antenna port set comprises a positive integer number of antenna port(s).

In one subsidiary embodiment of the above subembodiment, the antenna port is formed by a plurality of physical antennas through antenna virtualization. Mapping coefficients of the antenna port to the plurality of physical antennas constitute a beamforming vector used for the antenna virtualization, and a beam is thus formed.

In one subembodiment, the first antenna port set corresponds to P transmitting beam(s).

In one subsidiary embodiment of the above subembodiment, P is equal to 1.

In one subsidiary embodiment of the above subembodiment, a first antenna port set corresponds to a candidate transmitting beam recommended to a transmitter of the first signaling by the UE.

In one subembodiment, the first antenna port set corresponds to a first receiving antenna port set, the UE detects a UE-specific physical layer control signaling on a receiving antenna port set other than the first receiving antenna port set before transmitting the first radio signal.

In one subembodiment, the UE monitors the physical layer control signaling respectively on receiving antenna port set(s) corresponding to the K target antenna port set(s).

In one subsidiary embodiment of the above embodiment, the physical layer control signaling is at least one of PDCCH, NR-PDCCH, or SPDCCH.

In one subembodiment, the given target radio signal comprises at least one of a target control channel, a target data channel or a target reference signal. The UE determines a given channel quality according to at least one of the target control channel, the target data channel or the target reference signal; the given target radio signal is any of the K target radio signal(s), the given channel quality is the channel quality determined in accordance with the given target radio signal.

In one subsidiary embodiment of the above subembodiment, the target control channel is a physical layer control channel.

In one subsidiary embodiment of the above subembodiment, the target data channel is a physical layer data channel.

In one subsidiary embodiment of the above subembodiment, the target reference signal is at least one of Synchronization Sequence (SS), Demodulation Reference Signal (DMRS) or Channel State Information Reference Signal (CSI-RS).

In one subembodiment, the channel quality is at least one of Reference Signal Received Power (RSRP), Reference Signal Received Quality (RSRQ), Received Signal Strength Indicator (RSSI), or Signal to Noise Rate (SNR).

In one subembodiment, the channel quality is a Block Error Rate (BLER) of a target physical layer control signaling corresponding to the channel quality, the target physical layer control signaling is transmitted in the target radio signal corresponding to the channel quality.

In one subembodiment, the channel quality is an average result of detections in a fixed time window.

In one subembodiment, within a time window with fixed duration, each of the K channel quality(qualities) is less than a given threshold, the UE transmits the first radio signal.

In one subsidiary embodiment of the above subembodiment, the given threshold is a BLER.

In one subsidiary embodiment of the above subembodiment, the given threshold is measured in dB.

In one subsidiary embodiment of the above subembodiment, the given threshold is measured in dBm.

In one subembodiment, the third radio signal is a Media Access Control (MAC) Control Element (CE).

In one subembodiment, the third radio signal is feedback to the second radio signal.

In one subembodiment, the third radio signal is a RRC signaling.

In one subembodiment, the third radio signal is transmitted in a Downlink Shared Channel (DL-SCH).

In one subembodiment, the third radio signal is transmitted in DCI.

In one subembodiment, the third radio signal is used for triggering a monitoring on the third signaling set in a given time sub-window set.

In one subsidiary embodiment, the given time sub-window set comprises T1 time sub-window(s) in time domain, T1 is a positive integer.

As one example of the subsidiary embodiment, the T1 is equal to 1.

As one example of the subsidiary embodiment, the T1 time sub-windows are non-consecutive in time domain.

As one example of the subsidiary embodiment, the time sub-window is one of subframe, slot or mini-slot.

In one subembodiment, the phrase that the third radio signal is used for triggering a monitoring on a third signaling set means that the UE performs blind detection on the third signaling set in a given time sub-window set after receiving the third radio signal.

In one subembodiment, the phrase that the third radio signal is used for triggering a monitoring on a third signaling set means that the UE performs blind detection on the third signaling set in a given time sub-window set, a position of the given time sub-window set is related to time domain resources occupied by the third radio signal.

In one subsidiary embodiment of the above subembodiment, the given time sub-window set is located behind the third radio signal in time domain.

In one subsidiary embodiment of the above subembodiment, the given time sub-window set occupies a positive integer number of subframe(s).

In one subsidiary embodiment of the above subembodiment, the given time sub-window set occupies a positive integer number of slot(s).

In one subsidiary embodiment of the above subembodiment, the given time sub-window set occupies a positive integer number of mini-slot(s).

In one subembodiment, the third signaling set comprises a positive integer number of third signaling(s), wherein a physical layer channel for any of the third signaling is one of a PDCCH, a NR-PDCCH, or a SPDCCH.

In one subembodiment, the M3 is no less than 1.

In one subembodiment, a positive integer number of format(s) out of the M3 format(s) belongs(belong) to the M1 formats.

In one subembodiment, the first time-frequency resource set belongs to a target time sub-window in time domain, the third radio signal is used for determining a transmission format of a given time sub-window, the given time sub-window is a time sub-window behind the target time sub-window.

In one subsidiary embodiment of the above subembodiment, the target time sub-window corresponds to a slot, while the given time sub-window corresponds to a slot.

In one subsidiary embodiment of the above subembodiment, the target time sub-window corresponds to a subframe, while the given time sub-window corresponds to a subframe.

In one subsidiary embodiment of the above subembodiment, the transmission format is used for determining at least one of a number of OFDM symbols in the given time sub-window used for uplink transmission, a number of OFDM symbols used for GP or a number of OFDM symbols used for downlink transmission.

In one subsidiary embodiment of the above subembodiment, the given time sub-window is a downlink-dominated time window, the X2 is less than the X1.

In one subsidiary embodiment of the above subembodiment, the given time sub-window is an uplink-dominated time window, the X2 is equal to the X1.

In one subsidiary embodiment of the above subembodiment, the given time sub-window is used for Ultra-Reliable Low latency Communications (URLLC) transmission, the X2 is equal to the X1.

In one subsidiary embodiment of the above subembodiment, the given time sub-window is an Enhanced Interference Mitigation and Traffic Adaptation (eIMTA) time sub-window, the X2 is equal to the X1.

In one subembodiment, REs comprised in the third signaling set all belong to a third time-frequency resource set.

In one subsidiary embodiment of the above subembodiment, the UE performs at most Y3 blind detection(s) on the third signaling set in the third time-frequency resource set, Y3 is a difference between the X1 and the X2.

In one subsidiary embodiment of the above subembodiment, the third signaling set is a subset of the first signaling set, the third radio signal is used for determining that the UE performs at most Y4 blind detections in the third signaling set in the third time-frequency resource set, Y4 is greater than the X2.

As one example of the subsidiary embodiment, the second radio signal and the third radio signal are jointly used for determining that the UE performs at most Y5 blind detections in the third signaling set in the third time-frequency resource set, Y5 is equal to the X2.

In one subembodiment, the standardizing action means that the UE and the transmitter of the first radio signal have same understanding of the X3 second-type RE set(s).

In one subembodiment, the phrase that X3 second-type RE set(s) of the X2 second-type RE sets is(are) standardized means that the UE and the transmitter of the first radio signal have same understanding of the X3 second-type RE set(s).

In one subembodiment, the phrase that X3 second-type RE set(s) of the X2 second-type RE sets is(are) standardized means that index(indices) of the X3 second-type RE set(s) in the X2 second-type RE sets is(are) configurable.

In one subsidiary embodiment of the above subembodiment, the index(indices) is(are) configured by a higher layer signaling.

In one subembodiment, the phrase that X3 second-type RE set(s) of the X2 second-type RE sets is(are) standardized means that index(indices) of the X3 second-type RE set(s) in the X2 second-type RE sets is(are) defaulted, that is, pre-defined, or there is no need for definition by an explicit signaling.

In one subsidiary embodiment of the above subembodiment, the word defaulted means that the X3 second-type RE set(s) is(are) the second-type RE set(s) out of the X2 second-type RE sets, and a number of REs occupied by each of the X3 second-type RE set(s) is greater than a given threshold.

As one example of the subsidiary embodiment, the given threshold is one of 144, 288 or 576.

In one subembodiment, the phrase that X3 second-type RE set(s) of the X2 second-type RE sets is(are) standardized means that the X3 second-type RE set(s) of the X2 second-type RE sets is(are) prioritized to be subjected to blind detection.

In one subembodiment, the X3 second-type RE set(s) constitutes(constitute) a search space outside a UE-specific space.

In one subsidiary embodiment of the above subembodiment, the search space outside the UE-specific search space is common search space.

In one subembodiment, the base station N1 transmits the first signaling set in other second-type RE set(s) of the X2 second-type RE sets other than the X3 second-type RE set(s).

In one subembodiment, the phrase that the base station N1 transmits the first signaling set in the X3 second-type RE set(s) in the first place means that there is(are) unoccupied second-type RE set(s) existing in the X3 second-type RE set(s), the base station N1 does not transmit the first signaling set in any second-type RE set of the X2 second-type RE sets other than the X3 second-type RE set(s).

In one subsidiary embodiment of the above subembodiment, the base station N1 transmits the first signaling set in the unoccupied second-type RE set(s) existing in the X3 second-type RE set(s).

In one subembodiment, the phrase that the base station N1 transmits the first signaling set in the X3 second-type RE set(s) in the first place means that each of the X3 second-type RE set(s) is used for transmission of signaling set(s) other than the first signaling set, the base station N1 transmits the first signaling set in any second-type RE set of the X2 second-type RE sets other than the X3 second-type RE set(s).

In one subembodiment, an Aggregation Level (AL) of any first-type RE set of the X1 first-type RE sets other than the X2 first-type RE sets is lower than or equal to an AL of any second-type RE set of the X2 second-type RE sets.

Embodiment 6

Figure 6:
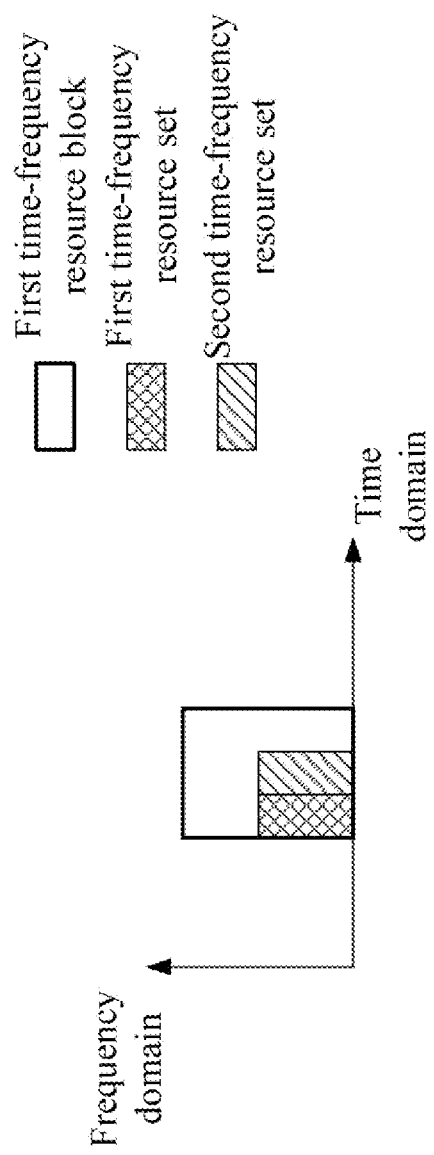
FIG. 6 illustrates a schematic diagram of a first time-frequency resource set according to one embodiment of the present disclosure.

Embodiment 6 illustrates a schematic diagram of a first time-frequency resource set, as shown in FIG. 6. In FIG. 6, the first time-frequency resource set and a second time-frequency resource set both belong to a first time-frequency resource block, the second time-frequency resource set is used for transmitting a second signaling set.

In one subembodiment, a given time-frequency resource set occupies frequency domain resources corresponding to a positive integer number of PRB(s) in frequency domain, and occupies a positive integer number of OFDM symbol(s) in time domain; the given time-frequency resource set is one of the first time-frequency resource set or the second time-frequency resource set.

In one subembodiment, a given time-frequency resource set corresponds to a search space, the given time-frequency resource set is one of the first time-frequency resource set or the second time-frequency resource set.

In one subembodiment, the first time-frequency resource block corresponds to one or more CORSETs.

Embodiment 7

Figure 7:
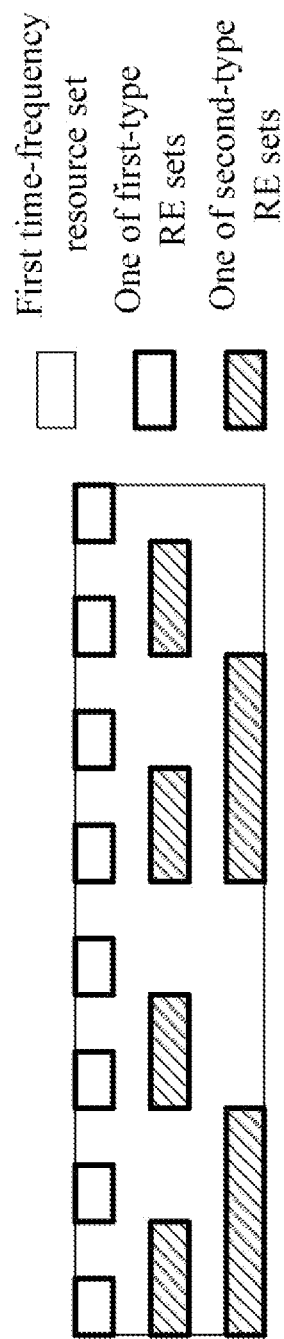
FIG. 7 illustrates a schematic diagram of first-type RE sets and second-type RE sets according to one embodiment of the present disclosure.

Embodiment 7 illustrates a schematic diagram of first-type RE sets and second-type RE sets, as shown in FIG. 7. In FIG. 7, a blank rectangle represents a pattern of each of the X1 first-type RE sets in a first time-frequency resource block, while a slash-filled rectangle represents a pattern of each of the X2 second-type RE sets in the first time-frequency resource block.

In one subembodiment, each of the first-type RE sets corresponds to a candidate.

In one subembodiment, each of the second-type RE sets corresponds to a candidate.

In one subembodiment, a number of REs occupied by each of the X2 second-type RE sets is greater than a first threshold; a number of REs occupied by any of the X1 first-type RE sets other than the X2 second-type RE sets is no greater than a first threshold; the first threshold is a positive integer.

In one subsidiary embodiment of the above subembodiment, the first threshold is one of 144, 288 or 576.

Embodiment 8

Figure 8:
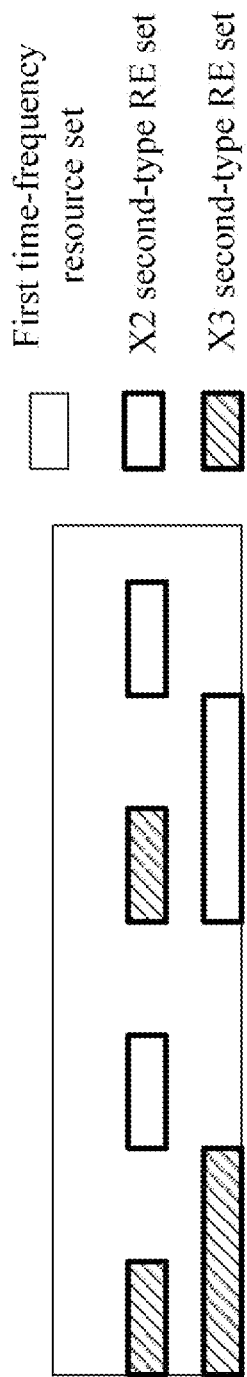
FIG. 8 illustrates a schematic diagram of X3 second-type RE set(s) of X2 second-type RE sets according to one embodiment of the present disclosure.

Embodiment 8 illustrates a schematic diagram of X3 second-type RE set(s) of X2 second-type RE sets, as shown in FIG. 8. In FIG. 8, a blank rectangle corresponds to a pattern of each of the X2 second-type RE sets in the first time-frequency resource block, while a slash-filled rectangle corresponds to a pattern of each of the X3 second-type RE sets in the first time-frequency resource block.

In one subembodiment, index(indices) of the X3 second-type RE set(s) in the X2 second-type RE sets is(are) configurable.

In one subembodiment, index(indices) of the X3 second-type RE set(s) in the X2 second-type RE sets is(are) defaulted, that is, pre-defined, or there is no need for definition by an explicit signaling.

In one subembodiment, the X3 second-type RE set(s) of the X2 second-type RE sets is(are) prioritized to be subjected to blind detection.

Embodiment 9

Figure 9:
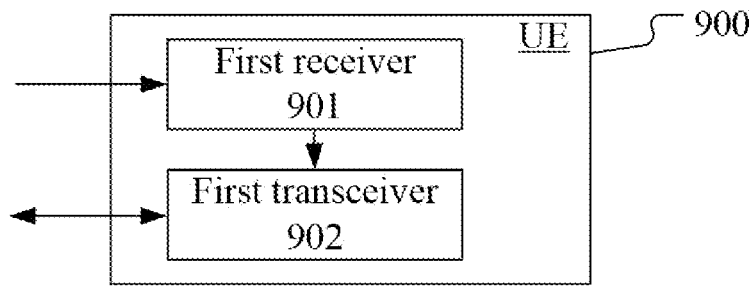
FIG. 9 illustrates a structure block diagram of a processing device in a UE according to one embodiment of the present disclosure.

Embodiment 9 illustrates a structure block diagram of a processing device in a UE, as shown in FIG. 9. In FIG. 9, a UE processing device 900 consists of a first receiver 901 and a first transceiver 902.

A first receiver 901, receiving a first radio signal; and a first transceiver 902, monitoring a first signaling set in a first time-frequency resource set.

In Embodiment 9, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one subembodiment, the first transceiver 902 also transmits a second radio signal; the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

In one subembodiment, the second radio signal is used for determining a first antenna port set, the first antenna port set comprises a positive integer number of antenna port(s), the UE assumes that the second signaling set is transmitted by the first antenna port set.

In one subembodiment, the first transceiver 902 also monitors K target radio signal(s) respectively on K target antenna port set(s); the K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer.

In one subembodiment, the first transceiver 902 also receives a third radio signal; the third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2.

In one subembodiment, X3 second-type RE set(s) of the X2 second-type RE sets is(are) standardized, the UE self-determines the second-type RE set(s) of the X2 second-type RE sets other than the X3 second-type RE set(s), X3 is a positive integer less than the X2.

In one subembodiment, a number of REs comprised in any first-type RE set of the X1 first-type RE sets other than the X2 second-type RE sets is less than or equal to a number of REs comprised in any of the X2 second-type RE sets.

In one subembodiment, the first receiver 901 comprises at least one of the receiving processor 456 or the controller/processor 459 in Embodiment 4.

In one subembodiment, the first transceiver 902 comprises at least one of the transmitting processor 468 or the controller/processor 459 in Embodiment 4.

In one subembodiment, the first transceiver 902 comprises at least one of the receiving processor 456 or the controller/processor 459 in Embodiment 4.

Embodiment 10

Figure 10:
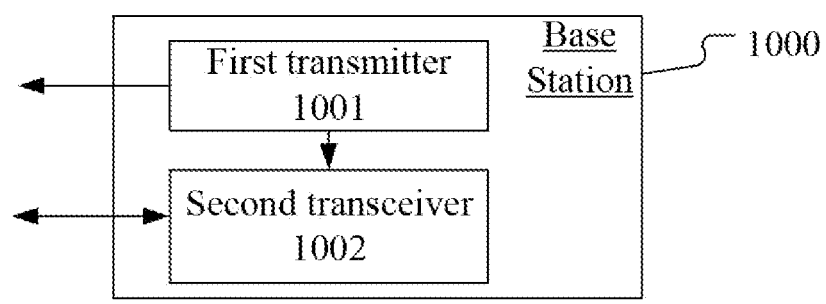
FIG. 10 illustrates a structure block diagram of a processing device in a base station according to one embodiment of the present disclosure.

Embodiment 10 illustrates a structure block diagram of a processing device in a base station, as shown in FIG. 10. In FIG. 10, a base station processing device 1000 consists of a first transmitter 1001 and a second transceiver 1002.

The first transmitter 1001, transmitting a first radio signal; and the second transceiver 1002, transmitting a first signaling set in a first time-frequency resource set.

In Embodiment 10, the first signaling set comprises M1 format(s) of physical layer signaling(s), the first radio signal is used for determining that the physical layer signaling(s) in the first signaling set may occupy any first-type RE set of X1 first-type RE sets, the X1 first-type RE sets all belong to the first time-frequency resource set, in the first time-frequency resource set at most X2 blind detections are performed in the first signaling set, the X2 blind detections are respectively for X2 second-type RE sets, the X2 RE sets are respectively X2 first-type RE sets of the X1 first-type RE sets, M1 is a positive integer, X1 and X2 are positive integers respectively, and the X1 is greater than the X2, the first-type RE set and the second-type RE set respectively comprise a positive integer number of RE(s).

In one subembodiment, the second transceiver 1002 also receives a second radio signal; the second radio signal is used for triggering a monitoring on a second signaling set, the second signaling set comprises M2 format(s) of physical layer signaling(s), M2 is a positive integer; the second radio signal is used for determining that a maximum number of blind detections performed in the first signaling set in the first time-frequency resource set is shifted from the X1 to the X2.

In one subembodiment, the second radio signal is used for determining a first antenna port set, the first antenna port set comprises a positive integer number of antenna port(s), a transmitter of the second radio signal assumes that the second signaling set is transmitted by the first antenna port set.

In one subembodiment, the second transceiver 1002 also transmits K target radio signal(s) respectively on K target antenna port set(s); the K target radio signal(s) is(are) used for determining K channel quality(qualities), at least one of the K target antenna port set(s) is used for transmitting the first signaling set, the first antenna port set is an antenna port set other than the K target antenna port set(s), K is a positive integer.

In one subembodiment, the second transceiver 1002 also transmits a third radio signal; the third radio signal is used for triggering a monitoring on a third signaling set, the third signaling set comprises M3 format(s) of physical layer signaling(s), M3 is a positive integer; the third radio signal is used for determining that a maximum number of blind detections in the first signaling set in the first time-frequency resource set is shifted from the X1 to the X2.

In one subembodiment, X3 second-type RE set(s) of the X2 second-type RE sets is(are) standardized, the base station transmits the first signaling set in the X3 second-type RE set(s) in the first place, the X3 is a positive integer less than the X2.

In one subembodiment, a number of REs comprised in any first-type RE set of the X1 first-type RE sets other than the X2 second-type RE sets is less than or equal to a number of REs comprised in any of the X2 second-type RE sets.

In one subembodiment, the first transmitter 1001 comprises at least one of the transmitting processor 416 or the controller/processor 475 in Embodiment 4.

In one subembodiment, the second transceiver 1002 comprises at least one of the receiving processor 470 or the controller/processor 475 in Embodiment 4.

In one subembodiment, the second transceiver 1002 comprises at least one of the transmitting processor 416 or the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for multi-antenna communication, comprising:
   receiving a first radio signal;
   transmitting a second radio signal;
   monitoring a second signaling set in a second time-frequency resource set in response to the second radio signal, the second signaling set comprising a set of formats of physical layer signaling, each format of the physical layer signaling corresponding to a respective DCI format, the second signaling set indicating a first antenna port set determined based on the second radio signal, the first antenna port set comprising a set of antenna port(s) and corresponding to a candidate transmitting beam recommended to a transmitter of a first signaling set by the UE;
   monitoring the first signaling set in a first time-frequency resource set, the first signaling set comprising a set of formats of physical layer signaling; and
   determining whether the physical layer signaling in the first signaling set occupies any first-type RE set of X1 first-type RE sets based on the first radio signal, the X1 first-type RE sets all belonging to the first time-frequency resource set, at most X2 blind detections being performed in the first signaling set in the first time-frequency resource set, the X2 blind detections being respectively for X2 second-type RE sets, the X2 RE sets being respectively X2 first-type RE sets of the X1 first-type RE sets, the X1 and the X2 each being positive integers, and the X1 being greater than the X2.

2. The method according to claim 1, further comprising determining at least one of time domain resources and frequency domain resources occupied by the first time-frequency resource set based on the first radio signal.

3. The method according to claim 1, further comprising determining time domain positions and frequency domain positions of REs occupied by the X1 first-type RE sets in the first time-frequency resource set based on the first radio signal.

4. The method according to claim 1, comprising monitoring K target radio signals respectively on K target antenna port sets,
   wherein the K target radio signals are used for determining K channel qualities, at least one of the K target antenna port sets is used for transmitting the first signaling set, the first antenna port set is an antenna port set other than the K target antenna port set(s), and the K is a positive integer.

5. The method according to claim 1, comprising receiving a third radio signal,
   wherein the third radio signal is used for triggering a monitoring on a third signaling set, the third signaling set comprising a set of formats of physical layer signaling, the third radio signal being for determining that a maximum number of blind detections in the first signaling set in the first time-frequency resource set are shifted from the X1 to the X2.

6. The method according to claim 1, wherein the first radio signal is a Radio Resource Control message, and the second radio signal is transmitted via a Random Access Channel.

7. The method according to claim 1, further comprising determining, based on the second radio signal, whether a maximum number of blind detections performed in the first signaling set in the first time-frequency resource set is shifted from the X1 to the X2, wherein the second time-frequency resource set is a search space.

8. A method in a base station (BS) for multi-antenna communication, comprising:
    transmitting a first radio signal;
    receiving a second radio signal;
    determining a first antenna port set in response to the second radio signal, the first antenna port set comprising a set of antenna port(s) and corresponding to a candidate transmitting beam recommended to the BS by a user equipment (UE);
    transmitting a second signaling set indicating the first antenna port set in a second time-frequency resource set in response to receiving the second radio signal the second signaling set comprising a set of formats of physical layer signaling, each format of the physical layer signaling corresponding to a respective DCI format;
    determining a first signaling set comprising the physical layer signaling occupies any first-type RE set of X1 first-type RE sets based on the first radio signal, the X1 first-type RE sets all belonging to a first time-frequency resource set, at most X2 blind detections being performed in the first signaling set in the first time-frequency resource set, the X2 blind detections being respectively for X2 second-type RE sets, the X2 RE sets being respectively X2 first-type RE sets of the X1 first-type RE sets, the X1 and the X2 each being positive integers, and the X1 being greater than the X2; and
    transmitting the first signaling set in the first time-frequency resource set, the first signaling set comprising a set of formats of physical layer signaling.

9. The method according to claim 8, further comprising determining at least one of time domain resources and frequency domain resources occupied by the first time-frequency resource set based on the first radio signal.

10. The method according to claim 8, further comprising determining time domain positions and frequency domain positions of REs occupied by the X1 first-type RE sets in the first time-frequency resource set based on the first radio signal.

11. The method according to claim 8, comprising transmitting K target radio signals respectively on K target antenna port sets,
    wherein the K target radio signals are used for determining K channel qualities, at least one of the K target antenna port sets is used for transmitting the first signaling set, the first antenna port set is an antenna port set other than the K target antenna port sets, and the K is a positive integer.

12. The method according to claim 8, comprising transmitting a third radio signal,
    wherein the third radio signal is used for triggering a monitoring on a third signaling set, the third signaling set comprises a set of formats of physical layer signalings, the third radio signal being for determining that a maximum number of blind detections in the first signaling set in the first time-frequency resource set are shifted from the X1 to the X2.

13. The method according to claim 8, wherein the first radio signal is generated by a Radio Resource Control sublayer, and the second radio signal is received via a Random Access Channel.

14. The method according to claim 8, further comprising determining, based on the second radio signal, whether a maximum number of blind detections performed in the first signaling set in the first time-frequency resource set is shifted from the X1 to the X2, wherein the second time-frequency resource set is a search space.

15. A User Equipment (UE) for multi-antenna communication, comprising:
    a transmitter for transmitting radio signals;
    a receiver for receiving radio signals;
    a computer-readable storage medium for storing instructions; and
    a processor coupled to the transmitter, the receiver, and the computer-readable storage medium, the processor for executing the stored instructions which cause the UE to:
        receive, via the receiver, a first radio signal;
        transmit, via the transmitter, a second radio signal;
        monitor a second signaling set in a second time-frequency resource set in response to the second radio signal, the second signaling set comprising a set of formats of physical layer signaling, each format of the physical layer signaling corresponding to a respective DCI format, the second signaling set indicating a first antenna port set determined based on the second radio signal, the first antenna port set comprising a set of antenna port(s) and corresponding to a candidate transmitting beam recommended to a transmitter of a first signaling set by the UE;
        monitor the first signaling set in a first time-frequency resource set, the first signaling set comprising a set of formats of physical layer signaling; and
        determine whether the physical layer signaling in the first signaling set occupies any first-type RE set of X1 first-type RE sets based on the first radio signal, the X1 first-type RE sets all belonging to the first time-frequency resource set, at most X2 blind detections being performed in the first signaling set in the first time-frequency resource set, the X2 blind detections being respectively for X2 second-type RE sets, the X2 RE sets being respectively X2 first-type RE sets of the X1 first-type RE sets, the X1 and the X2 each being positive integers, and the X1 being greater than the X2.

16. The UE according to claim 15, wherein the stored instructions further cause the UE to determine at least one of time domain resources and frequency domain resources occupied by the first time-frequency resource set based on the first radio signal.

17. The UE according to claim 15, wherein the stored instructions further cause the UE to determine time domain positions and frequency domain positions of REs occupied by the X1 first-type RE sets in the first time-frequency resource set based on the first radio signal.

18. A base station (BS) for multi-antenna communication, comprising:
- a transmitter for transmitting radio signals;
- a receiver for receiving radio signals;
- a computer-readable storage medium for storing instructions; and
- a processor coupled to the transmitter, the receiver, and the computer-readable storage medium, the processor for executing the stored instructions which cause the BS to:
    - transmit, via the transmitter, a first radio signal;
    - receive, via the receiver, a second radio signal;
    - determine a first antenna port set in response to the second radio signal, the first antenna port set comprising a set of antenna port(s) and corresponding to a candidate transmitting beam recommended to the BS by a user equipment (UE);
    - transmit, via the transmitter, a second signaling set indicating the first antenna port set in a second time-frequency resource set in response to receiving the second radio signal the second signaling set comprising a set of formats of physical layer signaling, each format of the physical layer signaling corresponding to a respective DCI format;
    - determine a first signaling set comprising the physical layer signaling occupies any first-type RE set of X1 first-type RE sets based on the first radio signal, the X1 first-type RE sets all belonging to a first time-frequency resource set, at most X2 blind detections being performed in the first signaling set in the first time-frequency resource set, the X2 blind detections being respectively for X2 second-type RE sets, the X2 RE sets being respectively X2 first-type RE sets of the X1 first-type RE sets, the X1 and the X2 each being positive integers, and the X1 being greater than the X2; and
    - transmit, via the transmitter, the first signaling set in the first time-frequency resource set, the first signaling set comprising a set of formats of physical layer signaling.

19. The BS according to claim 18, wherein the stored instructions further cause the BS to determine at least one of time domain resources and frequency domain resources occupied by the first time-frequency resource set based on the first radio signal.

20. The BS according to claim 18, wherein the stored instructions further cause the BS to determine time domain positions and frequency domain positions of REs occupied by the X1 first-type RE sets in the first time-frequency resource set based on the first radio signal.

* * * * *